United States Patent
Jaradi et al.

(10) Patent No.: US 12,365,307 B2
(45) Date of Patent: Jul. 22, 2025

(54) RESTRAINT FRAME FOR VEHICLE SEAT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 231 days.

(21) Appl. No.: 18/314,313

(22) Filed: May 9, 2023

(65) Prior Publication Data
US 2024/0375606 A1   Nov. 14, 2024

(51) Int. Cl.
| | | |
|---|---|---|
| A63G 31/12 | (2006.01) | |
| B60R 21/18 | (2006.01) | |
| B60R 21/231 | (2011.01) | |
| B60R 21/26 | (2011.01) | |
| B60R 22/14 | (2006.01) | |
| B60R 22/26 | (2006.01) | |

(52) U.S. Cl.
CPC .............. B60R 22/26 (2013.01); B60R 21/18 (2013.01); B60R 21/231 (2013.01); *B60R 2021/23107* (2013.01)

(58) Field of Classification Search
CPC ............ B60R 2021/0097; B60R 21/02; B60R 2021/022
See application file for complete search history.

(56) References Cited

U.S. PATENT DOCUMENTS

| | | | | |
|---|---|---|---|---|
| 5,265,823 | A * | 11/1993 | Doty ...................... | B60R 22/44 242/372 |
| 5,489,212 | A * | 2/1996 | Yoshimoto .............. | B60R 22/03 434/45 |
| 6,220,171 | B1 * | 4/2001 | Hettema ............. | B60R 22/3405 472/60 |
| 6,893,088 | B2 * | 5/2005 | Kassai ................. | B60N 2/2806 297/250.1 |
| 7,837,566 | B2 * | 11/2010 | Smith ..................... | B60R 22/34 472/130 |
| 8,308,245 | B2 * | 11/2012 | Roodenburg ......... | B60R 21/026 297/487 |
| 9,783,155 | B2 | 10/2017 | Kondo et al. | |
| 10,682,578 | B1 * | 6/2020 | Malatek ................. | A61B 5/024 |
| 11,273,785 | B1 | 3/2022 | Faruque et al. | |

(Continued)

*Primary Examiner* — Shin H Kim
(74) *Attorney, Agent, or Firm* — Frank A. MacKenzie; Brooks Kushman P.C.

(57) ABSTRACT

An assembly includes a vehicle seat including a seatback and a restraint frame including a first bar, a second bar spaced from the first bar, and a lap bar elongated from the first bar to the second bar. The seatback has a top end and a bottom end, is elongated along a first axis from the top end to the bottom end, and the first bar and the second bar each have a first end and a second end. The bars are elongated from the first ends to the second ends. The first ends of the bars are hingedly attached at the top end. The second ends are releasably lockable to the seatback at the bottom end. The restraint frame is hinged to the seatback and rotatable about a cross-seat axis from a raised position to a locked position.

20 Claims, 11 Drawing Sheets

(56) References Cited

U.S. PATENT DOCUMENTS

| | | | |
|---|---|---|---|
| 11,628,798 B2 * | 4/2023 | Sornik | B60R 22/04 |
| | | | 297/477 |
| 12,030,451 B2 * | 7/2024 | Wilcox | B60R 21/02 |
| 2003/0024428 A1 * | 2/2003 | Kroon | A63G 27/04 |
| | | | 104/53 |
| 2008/0143158 A1 * | 6/2008 | Roodenburg | A63G 7/00 |
| | | | 297/484 |
| 2008/0211278 A1 * | 9/2008 | Macliver | B60N 2/2812 |
| | | | 297/464 |
| 2008/0303260 A1 * | 12/2008 | Jaskol | B60R 22/48 |
| | | | 280/801.1 |
| 2010/0102604 A1 * | 4/2010 | Barnes | B60N 2/2872 |
| | | | 297/410 |
| 2012/0068521 A1 * | 3/2012 | Roodenburg | B60R 21/026 |
| | | | 297/487 |
| 2018/0111054 A1 * | 4/2018 | Buck | B25J 11/003 |
| 2019/0118755 A1 | 4/2019 | Dry et al. | |
| 2019/0275979 A1 | 9/2019 | Dry et al. | |
| 2020/0180556 A1 * | 6/2020 | Bruno | B60R 22/48 |
| 2020/0216013 A1 * | 7/2020 | Sornik | B60R 21/00 |
| 2021/0179013 A1 * | 6/2021 | Malatek | A63G 31/00 |
| 2021/0229613 A1 * | 7/2021 | Wilcox | A63G 31/00 |
| 2021/0245694 A1 * | 8/2021 | Caelen | A63G 21/20 |
| 2021/0270295 A1 * | 9/2021 | Syrcle | F16J 1/008 |
| 2021/0354646 A1 * | 11/2021 | Wilcox | B60R 21/02 |

* cited by examiner

RESTRAINT FRAME FOR VEHICLE SEAT

BACKGROUND

It is anticipated that technology and regulatory framework may evolve in the future where a vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

Figure 1A:
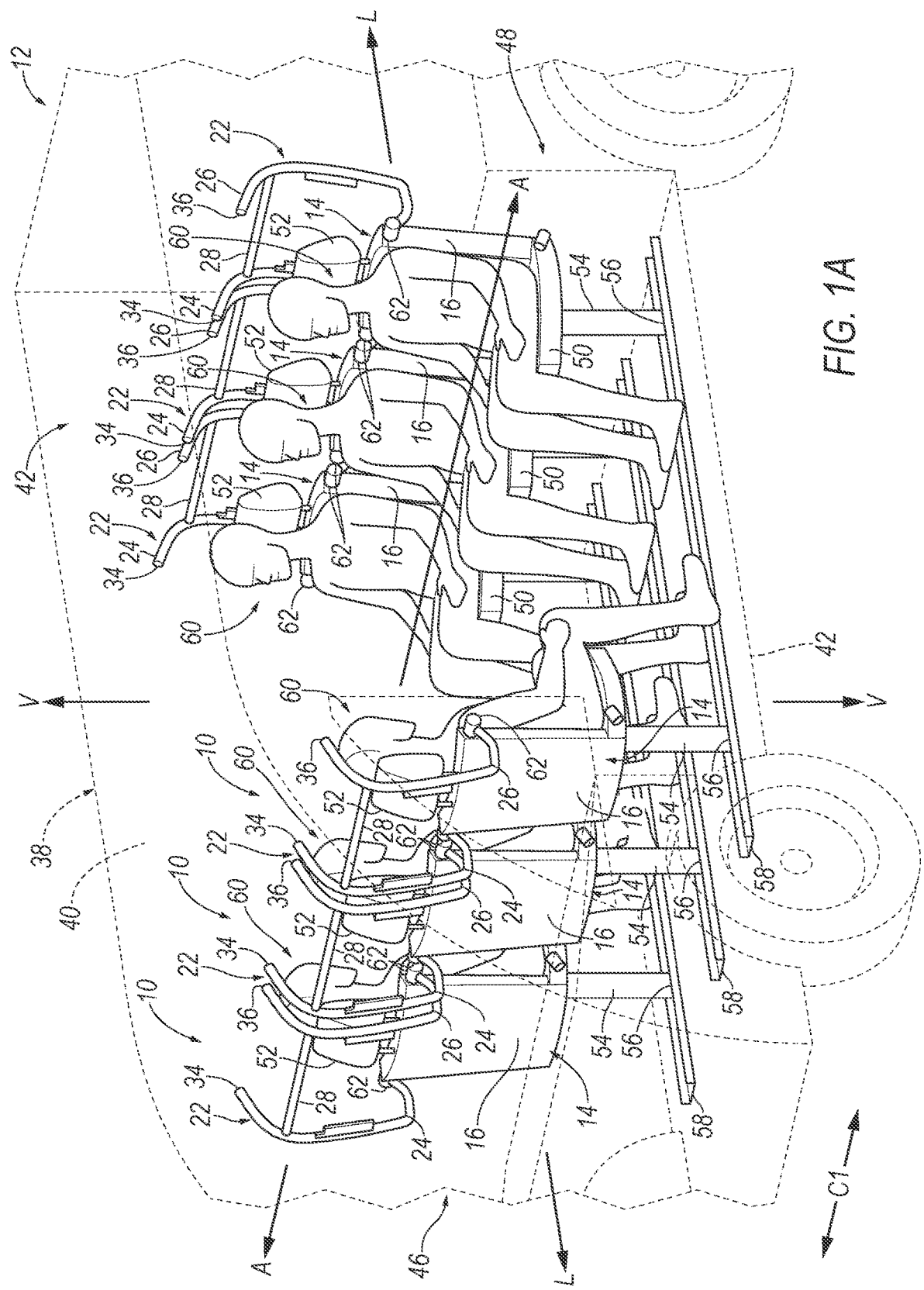
FIG. 1A is a perspective view of a vehicle having vehicle seats with a first example of restraint frames in raised positions supported by the vehicle seats.

An assembly includes a vehicle seat including a seatback. The seatback has a top end and a bottom end. The seatback is elongated along a first axis from the top end to the bottom end. The assembly includes a restraint frame including a first bar, a second bar spaced from the first bar in a cross-seat direction, and a lap bar elongated in the cross-seat direction from the first bar to the second bar. The first bar and the second bar each have a first end and a second end. The first bar is elongated between the first end of the first bar and the second end of the first bar and the second bar is elongated from the first end of the second bar to the second end of the second bar. The first end of the first bar and the first end of the second bar are hingedly attached at the top end of the seatback. The second end of the first bar and the second end of the second bar are releasably lockable to the seatback at the bottom end of the seatback. The restraint frame is hinged to the seatback. The restraint frame is rotatable about a cross-seat axis from a raised position to a locked position relative to the seatback.

The restraint frame may include a belt elongated from the first bar to the second bar in the cross-seat direction.

The restraint frame may include a second belt elongated from the first bar to the second bar, the second belt being spaced from the belt along the first bar and the second bar.

The belt and the second belt may be movable relative to the first bar and the second bar from a lowered position to an upper position.

The belt may include a first airbag inflatable to an inflated position and the second belt includes a second airbag inflatable to an inflated position. The first airbag and the second airbag each may extend from the first bar to the second bar in the inflated positions.

The assembly may include a third belt extending from the first bar to the second bar and including a third airbag inflatable to an inflated position. The third airbag may extend from the first bar to the second bar in the inflated position.

The belt may include an airbag inflatable from an uninflated position to an inflated position. The airbag may extend from the first bar to the second bar in the inflated position.

The belt may be movable relative to the first bar and the second bar from a lowered position to an upper position.

The assembly may include a computer including a processor and a memory storing instructions executable by the processor to detect occupancy of the vehicle seat by an occupant, identify a size of the occupant, in response to detecting the occupant, move the restraint frame from the raised position to the lowered position, position the belt between the first end and the second end of the first bar and between the first end and second end of the second bar based on the size of the occupant, and lock the first bar and the second bar relative to the seatback.

The seatback may define an occupant seating area between the belt and the seatback.

The belt may be inflatable to an inflated position between the first bar and the second bar.

The assembly may include a computer including a processor and a memory storing instructions executable by the processor to detect occupancy of the vehicle seat by an occupant, in response to detecting the occupant, move the restraint frame from the raised position to a lowered position, and lock the first bar and the second bar relative to the seatback.

The seatback may define an occupant seating area between the seatback and the restraint frame in the locked position.

The occupant seating area may be between the first bar and the second bar in the cross-seat direction.

At least a portion of the first bar and at least a portion of the second bar may be spaced seat-forward of the seatback in the locked position.

The restraint frame may extend upwardly from the top end of the seatback in the raised position.

The assembly may include an armrest supported by the restraint frame. The armrest may be rotatable relative to the restraint frame.

The armrest may be supported by one of the first bar or the second bar.

The assembly may include a second armrest supported by the restraint frame. The second armrest may be rotatable relative to the restraint frame.

The armrest may be supported by one of the first bar or the second bar and the second armrest is supported by the other of the first bar or the second bar.

With reference to the Figures, wherein like numerals indicate like parts throughout the several views, an assembly 10 for a vehicle 12 includes a vehicle seat 14 including a seatback 16. The seatback 16 has a top end 18 and a bottom end 20. The seatback 16 is elongated along a first axis B from the top end 18 to the bottom end 20. The assembly 10 includes a restraint frame 22 including a first bar 24, a second bar 26 spaced from the first bar 24 in a cross-seat direction C2, and a lap bar 28 elongated in the cross-seat direction C2 from the first bar 24 to the second bar 26. The first bar 24 and the second bar 26 each have a first end 30, 34 and a second end 32, 36. The first bar 24 is elongated between the first end 30 of the first bar 24 and the second end 32 of the first bar 24 and the second bar 26 is elongated from the first end 34 of the second bar 26 to the second end 36 of the second bar 26. The first end 30 of the first bar 24 and the first end 34 of the second bar 26 are hingedly attached at the top end 18 of the seatback 16. The second end 32 of the first bar 24 and the second end 36 of the second bar 26 are releasably lockable to the seatback 16 at the bottom end 20 of the seatback 16. The restraint frame 22 is hinged to the seatback 16. The restraint frame 22 is rotatable about a cross-seat axis D from a raised position to a locked position relative to the seatback 16.

The restraint frame 22 may surround a seated occupant seated directly on the vehicle seat 14. In this document, "seated occupant" refers to a properly seated occupant seated directly on the vehicle seat. The belt elongated from the first bar 24 to the second bar 26 is seat-forward of seated occupant of the vehicle seat 14. The restraint frame 22 may surround a seated occupant in any different vehicle seat 14 configurations. For example, it is anticipated that technology and the regulatory framework may evolve in the future to where position of the vehicle seat 14 in a rearward-facing position becomes safe and permissible and, in such cases, the restraint frame 22 may be in the locked position when the vehicle seat 14 is forward-facing and rearward-facing. The restraint frame 22 may surround the seated occupant in the locked position during certain vehicle impacts.

Three examples of the restraint frame 22 are shown in the Figures and common numerals are used to identify common features in the examples. A first example of the restraint frame 22 is shown in FIGS. 1A-3A. In such an example, the belts 80, 82, 84 between the first bar 24 and the second bar 26 move from lowered positions to upper positions. A second example of the restraint frame 22 is shown in FIG. 4. In such an example, one of the belts 84 between the first bar 24 and the second bar 26 move from a lowered position to an upper position. A third example of the restraint frame 22 is shown in FIG. 5. In such an example, the belts 80, 82, 84 are fixed relative to the first bar 24 and the second bar 26.

Figure 1B:
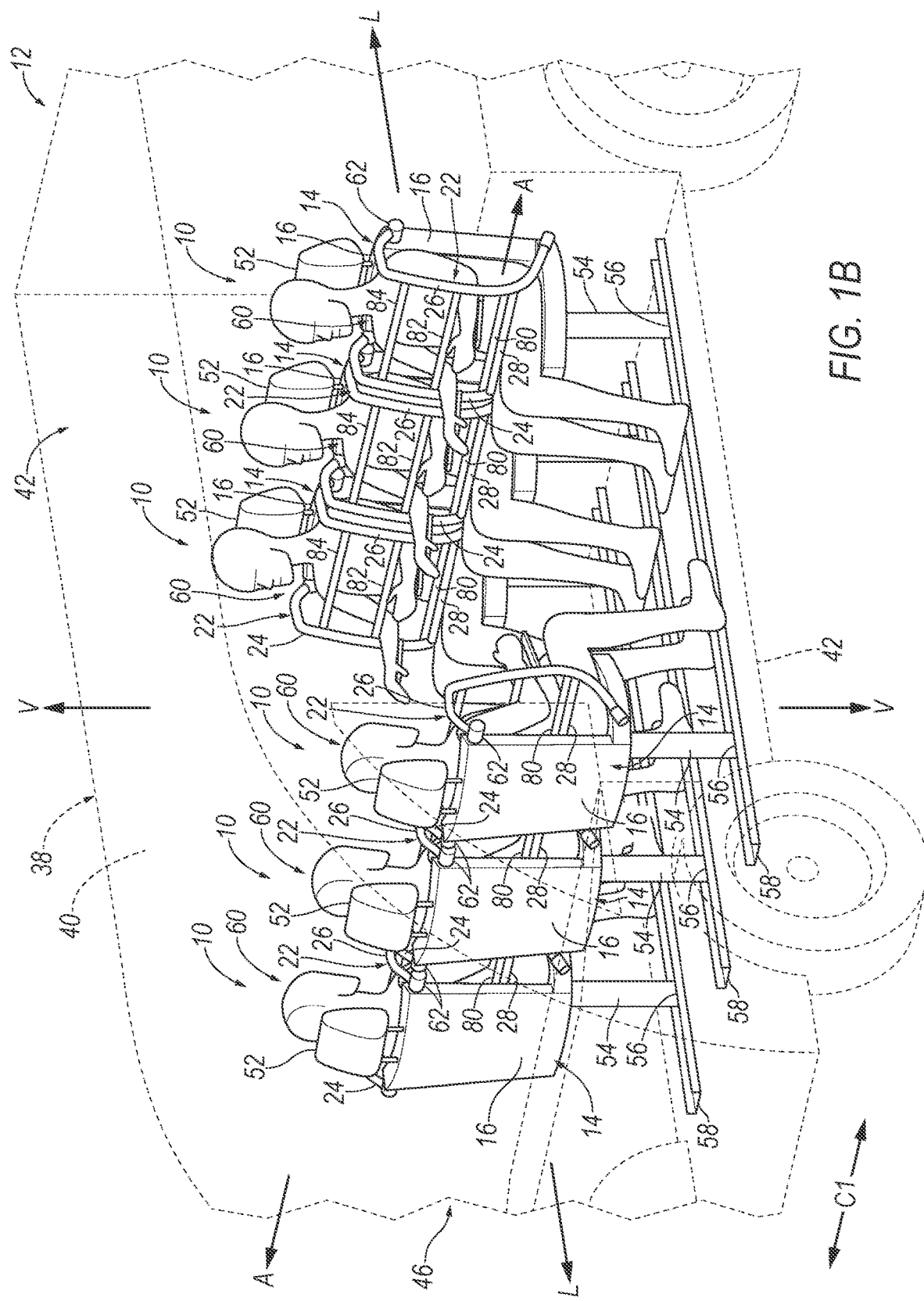
FIG. 1B is a perspective view of the vehicle with the first example of the restraint frames in locked positions.

With reference to FIGS. 1A and 1B, the vehicle 12 may be any suitable type of ground vehicle, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 12 defines a vehicle-longitudinal axis L extending between a front vehicle end (not numbered) and a rear vehicle end (not numbered) of the vehicle 12. The vehicle 12 defines a cross-vehicle axis A extending cross-vehicle from one side to the other side of the vehicle 12. A cross-vehicle direction C1 is parallel to the cross-vehicle axis A. The vehicle 12 defines a vertical axis V. The vehicle-longitudinal axis L, the cross-vehicle axis A, and the vertical axis V are perpendicular relative to each other.

The vehicle 12 may include a vehicle body 38. The vehicle body 38 includes body panels (not all numbered) partially defining an exterior of the vehicle 12. The body panels may present a class-A surface, e.g., a finished surface exposed to view by a customer and free of unaesthetic blemishes and defects. As discussed below, the vehicle body 38 includes a vehicle roof 40 and a vehicle floor 42.

The vehicle body 38 may include a body side (not numbered) extending from the vehicle floor 42 to the vehicle roof 40. The body side may be of any suitable material. The body side may define openings (not shown) for vehicle doors (not shown) for ingress and egress of occupants and wheelchairs. The vehicle 12 may include a body side on each side of the vehicle 12. In other words, the body sides may be spaced cross-vehicle from each other. The body sides may be identical on each side of the vehicle 12 or may be different on each side of the vehicle 12, depending on the type of vehicle.

The vehicle 12 defines a passenger compartment 44 to house occupants, if any, of the vehicle 12. The passenger compartment 44 may extend across the vehicle 12, i.e., from one side to the other side of the vehicle 12. The passenger compartment 44 includes a front end 46 and a rear end 48 with the front end 46 being in front of the rear end 48 during forward movement of the vehicle 12.

The vehicle 12 includes the vehicle floor 42 that defines the lower boundary of the passenger compartment 44. The vehicle floor 42 may extend from the front end 46 of the passenger compartment 44 to the rear end 48 of the passenger compartment 44. The vehicle floor 42 may include upholstery, for example, carpet, and may have a class-A surface facing the passenger compartment 44, i.e., a surface specifically manufactured to have a high quality, finished, aesthetic appearance free of blemishes.

The vehicle roof 40 and the vehicle floor 42 are spaced from each other. Specifically, the vehicle floor 42 is spaced downwardly from the vehicle roof 40. Specifically, the vehicle floor 42 is spaced downwardly along the vertical axis V from the vehicle roof 40. The vehicle roof 40 defines the upper boundary of the passenger compartment 44 and may extend from the front end 46 of the passenger compartment 44 to the rear end 48 of the passenger compartment 44. The vehicle roof 40 may include a roof panel (not numbered) extending from one side of the vehicle 12 to the other.

With reference to FIGS. 1A-6, the vehicle 12 may include one or more vehicle seats 14 (hereinafter referred to as "seat 14"). Specifically, the vehicle 12 may include any suitable number of seats 14. The seats 14 are supported by the vehicle floor 42. The seats 14 may be arranged in any suitable arrangement in the passenger compartment 44. The vehicle 12 may include one or more rows of seats 14 with each row of seats 14 having one or more seats 14. In the example shown in FIGS. 1A and 1B, the vehicle 12 includes two rows of seats 14 and each row having three seats 14. In such an example, one of the rows is facing vehicle-forward and one of the rows is facing vehicle-rearward.

The seats 14 include the seatback 16, a seat bottom 50, and a head restraint 52. The head restraint 52 may be supported by and extending upwardly from the seatback 16. The head restraint 52 may be stationary or movable relative to the seatback 16. The seatback 16 may be supported by the seat bottom 50 and may be stationary or movable relative to the seat bottom 50. The seatback 16 extends from a top end 18 to a bottom end 20. Specifically, the seatback 16 is elongated along the first axis B from the top end 18 to the bottom end 20. In other words, a length of the seatback 16 may be elongated along the first axis B. The top end 18 of the v may extend along the cross-seat axis D. In other words, the width of the seatback 16 may extend along the cross-seat direction C2. The bottom end 20 may be connected to the seat bottom 50. The top end 18 of the seatback 16 may be spaced upwardly from the bottom end 20 of the seatback 16, i.e., upwardly from the seat bottom 50.

The seatback 16, the seat bottom 50, and the head restraint 52 may be adjustable in multiple degrees of freedom. Specifically, the seatback 16, the seat bottom 50, and the head restraint 52 may themselves be adjustable. In other words, adjustable components within the seatback 16, the seat bottom 50, and the head restraint 52 may be adjustable relative to each other.

The seatback 16 includes a seat frame (not shown) and a covering (not numbered) supported on the seat frame. The seat frame may include tubes, beams, etc. Specifically, the seat frame includes a pair of upright frame members (not shown). The upright frame members are elongated, and specifically, are elongated in a generally upright direction when the seatback 16 is in a generally upright position. The upright frame members are spaced from each other and the seat frame includes one or more cross-members extending between the upright frame members. The seat frame, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

The seat 14 includes a pedestal 54 fixed to the seat bottom 50. The pedestal 54 is supported by the vehicle floor 42. Specifically, the pedestal 54 extends from the seat bottom 50 to a base 56 supported by the vehicle floor 42. The pedestal 54 may be fixed to the seat bottom 50 in any suitable way, e.g., welding, fasteners, etc.

The vehicle 12 may include one or more tracks 58 supported by the vehicle floor 42. Specifically, the track 58 is fixed to the vehicle floor 42. In the example shown in FIGS. 1A and 1B, the track 58 is elongated along the vehicle-longitudinal axis L. The track 58 may be fixed to the vehicle floor 42 in any suitable way, e.g., welding, fasteners, etc.

The seat 14 may be slidable relative to the vehicle floor 42. Specifically, the base 56 of the pedestal 54 may be slidably attached to the track 58, i.e., the base 56 may slide relative to the vehicle floor 42 of the passenger compartment 44 along the track 58. Specifically, the pedestal 54 is slidable along the track 58. The pedestal 54 may be slidable along the track 58 to adjust the position of the seats 14 in the passenger compartment 44.

With continued reference to FIGS. 1A-6, the seat 14, specifically, the seatback 16 and the seat bottom 50 define an occupant seating area 60 of the seat 14. The occupant seating area 60 is the area occupied by a seated occupant when properly seated on the seat bottom 50 and the seat back. The occupant seating area 60 is in a seat-forward direction of the seatback 16 and above the seat bottom 50. In the example shown in the Figures, the occupant seating area 60 faces the front end 46 of the passenger compartment 44 when the seat 14 is in the forward-facing position and the occupant seating area 60 faces the rear end 48 of the passenger compartment 44 when the seat 14 is in the rearward-facing position.

The seatback 16 may have bolsters 112 on opposite sides of the occupant seating area 60. The bolsters 112 are elongated, and specifically, are elongated in a generally upright direction when the seatback 16 is in a generally upright position. Specifically, the bolsters 112 may be elongated along the first axis B of the seatback 16. The bolsters 112 may be spaced from each other in the cross-seat direction C2. The bolsters 112 define cross-seat boundaries of the seatback 16, i.e., the seatback 16 terminates at the bolsters 112. The bolsters 112 may extend in the seat-forward direction relative to the occupant seating area 60, i.e., on opposite sides of the torso and shoulders of a seated occupant seated on the seat 14. The extension of the bolsters 112 relative to the occupant seating area 60 may be defined by the upright frame members and/or the covering. In the example shown in the Figures, the size and shape of both the upright frame members and the covering form the bolsters 112.

The vehicle 12 may include the restraint frame 22 supported by the seat 14. Specifically, as shown in the Figures, the restraint frame 22 may be supported by each of the seats 14 in the passenger compartment 44. In other words, an individual restraint frame 22 may be supported by each of the seats 14 of the vehicle 12. The restraint frame 22 is supported by the seatback 16 of the seat 14. Specifically, the restraint frame 22 is supported by the top end 18 of the seatback 16. The restraint frame 22 may be supported by the seat frame of the seatback 16. The restraint frame 22 is fixed relative to the seatback 16 along the first axis B, but the restraint frame 22 is rotatable about the cross-seat axis D relative to the seat 14. As discussed further below, the restraint frame 22 is rotatably supported by seat 14. In other words, the restraint frame 22 is rotatable relative to the seat 14 from the raised position to the locked position.

The restraint frame 22 is in the locked position when a seated occupant is seated on the seat 14, (i.e., an occupant properly seated directly on the seat 14 as stated above). The restraint frame 22 may be in the raised position when no seated occupant is detected on the seat 14 (e.g., when no occupant is seated on the seat 14, when an occupant is becoming seated on the seat 14, when an occupant is exiting the seat 14, and/or when a child restraint system (not shown) is identified on the seat 14 thus preventing possibility of an occupant properly seated directly on the seat). The restraint frame 22 may extend upwardly from the top end 18 of the seatback 16 in the raised position to allow an occupant to become seated in the seat 14 or to allow an occupant to exit the seat 14. The restraint frame 22 remains in the raised position when a child restraint system is identified in the seat 14. Specifically, the vehicle 12 may identify a child restraint system using an occupant classification system, sensors, cameras, weight sensors, a combination thereof, or any other suitable way of identifying the child restraint system. Described further below, an occupancy sensor 106 may identify the child restraint system. The restraint frame 22 may be adjacent the seatback 16 in the locked position such that the occupant is between the restraint frame 22 and the seatback 16. Specifically, the restraint frame 22 may surround the occupant seating area 60 of the seat 14 for the occupant to be between the restraint frame 22 and the seatback 16 when in the locked position. In other words, in the locked position, the occupant seating area 60 is between the restraint frame 22 and the seatback 16.

As discussed above, the restraint frame 22 is rotatable relative to the seat 14. Specifically, the restraint frame 22 is hinged to the seat 14. In other words, the restraint frame 22 is hingedly attached to the seat 14. The restraint frame 22 is hingedly attached to the seatback 16. Specifically, the restraint is hingedly attached to the top end 18 of the seatback 16. In other words, the restraint frame 22 is hinged to the seatback 16 to rotate between the raised position and the locked position. The restraint frame 22 is rotatable about the cross-seat axis D to rotate from the raised position and the locked position relative to the seatback 16. The restraint frame 22 may rotate about a pair of hinges 62 rotatably attached to the seat 14 to move the restraint frame 22 from the raised position to the locked position. In other words, the restraint frame 22 rotates between the raised position and the locked position about the hinges 62. The hinges 62 are attached to the top end 18 of the seatback 16 of the seat 14 and are spaced from each other in the cross-seat direction C2. In other words, one of the hinges 62 is at one side of the seatback 16 and the other of the hinges 62 is on the opposite side of the seatback 16 such that the hinges 62 are spaced from each other in the cross-seat direction C2. The head restraint 52 is supported by the seatback 16 between the hinges 62 in the cross-vehicle direction C1. The hinges 62 are centered about the cross-seat axis D to allow the restraint frame 22 to rotate about the cross-seat axis D. In other words, the restraint frame 22 rotates about the cross-seat axis D to hinge the restraint frame 22 from the raised position to the locked position.

With reference to FIGS. 2A-6, the restraint frame 22 includes a proximal end 64 and a terminal end 66 spaced from the proximal end 64. The restraint frame 22 is elongated from the proximal end 64 to the terminal end 66. The proximal end 64 is connected to the seat 14 and the terminal end 66 is lockable relative to the seat 14. Specifically, the proximal end 64 of the restraint system is attached to the seat 14 at the top end 18 of the seat 14 and the terminal end 66 is movable and releasably lockable relative to the bottom end 20 of the seat 14. The hinges 62 are at the proximal end 64 of the restraint system to allow the restraint frame 22 to rotate about the hinge 62 from the raised position and the locked position.

To move from the raised position to the locked position, the restraint frame 22 is rotatable relative to the seat 14. Specifically, the restraint frame 22 may rotate about the cross-seat axis D. The proximal end 64 of the restraint frame 22 is rotatable about the cross-seat axis D from the raised position to the locked position. The proximal end 64 of the restraint frame 22 is rotatable about the hinges 62 to move from the locked position to the raised position. The proximal end 64 of the restraint frame 22 may rotate relative to seatback 16 and the terminal end 66 of the restraint frame 22 may rotate about the proximal end 64 as the restraint frame 22 moves between the raised position and the locked position.

In both the raised position and the locked position, the proximal end 64 of the restraint frame 22 remains attached to the top end 18 of the seatback 16 at the hinges 62 and the proximal end 64 is rotatable relative to the seatback 16 about the cross-seat axis D at the hinges 62. In other words, the proximal end 64 is proximal to the top end 18 of the seatback 16 in the raised position and the locked position and the proximal end 64 rotates to move the restraint frame 22 from the raised position to the locked position. As discussed above, the terminal end 66 is spaced from the proximal end 64. In the raised position, the terminal end 66 is distal to the proximal end 64. Specifically, the terminal end 66 may be spaced upwardly from the top end 18 of the seatback 16 and the proximal end 64 of the restraint frame 22 in the raised position. In the locked position, the terminal end 66 may be adjacent the bottom end 20 of the seatback 16. In other words, in the locked position, the terminal end 66 is spaced downwardly from the top end 18 of the seatback 16 and the proximal end 64 along the first axis B of the seatback 16.

In the raised position, each of the first bar 24 and the second bar 26 are elongated upwardly from the top end 18 of the seatback 16. Specifically, each of the first bar 24 and the second bar 26 are elongated upwardly from the first ends 30, 34 attached to the top end 18 of the seatback 16 to the second ends 32, 36 spaced from the first ends 30, 34. In the locked position, each of the first bar 24 and the second bar 26 are elongated along the bolsters 112 of the seatback 16 from the top end 18 of the seatback 16 to the bottom end 20 of the seatback 16. In the locked position, at least a portion of the first bar 24 and at least a portion of the second bar 26 is spaced seat-forward of the seatback 16. In other words, at least a portion of each of the bars 24, 26 extends seat-forward from the first end 30, 34 such that the occupant seating area 60 is between the bars 24, 26 and the seatback 16. The occupant seating area 60 may be between the first bar 24 and the second bar 26 in the cross-seat direction C2 in both the raised position and the locked position. The first bar 24 and the second bar 26 may be elongated seat-forward of the shoulders and torso of the seated occupant of the seat 14.

With continued reference to FIGS. 2A-6, the restraint frame 22 includes the first bar 24, the second bar 26, and the lap bar 28. The first bar 24 and the second bar 26 are each connected to the seatback 16 at the top end 18 of the seatback 16. The first bar 24 and the second bar 26 are spaced from each other in the cross-seat direction C2. Specifically, the first bar 24 is connected to the top end 18 of the seatback 16 on one side of the seat 14 and the second bar 26 is connected to the top end 18 of the seatback 16 on the opposite side of the seat 14 such that the first bar 24 and the second bar 26 are spaced from each other in the cross-seat direction C2. The head restraint 52 of the seat 14 is supported by the seatback 16 between the first bar 24 and the second bar 26 in the cross-vehicle direction C1.

The first bar 24 includes the first end 30 of the first bar 24 and the second end 32 of the first bar 24. The second bar 26 includes the first end 34 of the second bar 26 and the second end 36 of the second bar 26. The first bar 24 is elongated from the first end 30 of the first bar 24 and the second end 32 of the first bar 24. The second bar 26 is elongated from the first end 34 of the second bar 26 and the second end 36 of the second bar 26. As described further below, the first bar 24 and the second bar 26 are each connected to the seat 14, specifically, the seatback 16, at the first ends 30, 34 and the second ends 32, 36 are releasably lockable relative to the seatback 16.

The first end 30 of the first bar 24 and the first end 34 of the second bar 26 are each at the proximal end 64 of the restraint frame 22. In other words, the first end 30 of the first bar 24 and the first end 34 of the second bar 26 are each connected to the seat 14 at the proximal end 64 of the restraint frame 22. Specifically, the first ends 30, 34 of the bars 24, 26 are connected to the top end 18 of the seatback 16.

The first end 30 of the first bar 24 and the first end 34 of the second bar 26 are hingedly attached to the seat 14 to move the restraint frame 22 from the raised position to the locked position. Specifically, the first end 30 of the first bar 24 and the first end 34 of the second bar 26 are hingedly attached to the top end 18 of the seatback 16. In other words, the first ends 30, 34 of the bars 24, 26 are rotatable about the cross-seat axis D at the top end 18 of the seatback 16 to move the restraint frame 22 from the raised position to the locked position. The first ends 30, 34 of the bars 24, 26 are coupled to the hinges 62 to allow the first ends 30, 34 of the bars 24, 26 to rotate about the cross-seat axis D. In other words, the restraint frame 22 is rotatable about the first ends 30, 34 of the bars 24, 26 to move from the raised position and the locked position.

The second end 32 of the first bar 24 and the second end 36 of the second bar 26 are at the terminal end 66 of the restraint frame 22. In other words, the second end 32 of the first bar 24 and the second end 36 of the second bar 26 are each distal to the first ends 30, 34 of the bars 24, 26. In other words, the second ends 32, 36 of the bars 24, 26 are spaced from the first ends 30, 34 of the bars 24, 26 along the bars 24, 26. In the locked position, the first ends 30, 34 are spaced from the second ends 32, 36 along the first axis B of the seatback 16 because the first ends 30, 34 are attached to the top end 18 of the seatback 16 and the second ends 32, 36 are lockable to the bottom end 20 of the seatback 16 as discussed below.

The terminal end 66 of the restraint frame 22 is lockable relative to the seatback 16. In other words, the terminal end 66 of the restraint frame 22 is releasably lockable relative to the seatback 16. Specifically, in the locked position, the terminal end 66 of the restraint frame 22 is lockable relative to the bottom end 20 of the seatback 16. Because the second end 32 of the first bar 24 and the second end 36 of the second bar 26 are at the terminal end 66 of the restraint frame 22, the second ends 32, 36 are lockable relative to the seatback 16. Specifically, the second ends 32, 36 are releasably lockable relative to the bottom of the seatback 16.

One or more locks 68 may be supported by the seatback 16 to maintain the restraint frame 22 in the locked position. Specifically, one or more locks 68 may be supported at the bottom end 20 of the seatback 16. For example, two locks 68 may be supported by the bottom end 20 of the seatback 16 with one lock 68 on one side of the seatback 16 and another lock 68 on the opposite side of the seatback 16. In other words, in such an example, the seatback 16 may be between the two locks 68. One or more locks 68 may be engageable with the terminal end 66 of the restraint frame 22. Specifically, one or more locks 68 may be engageable with one or more of the second ends 32, 36 of the bars 24, 26 to releasably lock the restraint frame 22 in the locked position. When the restraint frame 22 is in the locked position, the one or more locks 68 are engaged with the second ends 32, 36 of the bars 24, 26 to maintain the restraint frame 22 in the locked position. When the restraint frame 22 is to move to the raised position, the one or more locks 68 are disengaged from the second ends 32, 36 of the bars 24, 26 and the restraint frame 22 may hinge upwardly to move to the raised position. In an example having two locks 68, such as shown in the Figures, one of the locks 68 is engageable with the second end 32 of the first bar 24 in the locked position and the other of the locks 68 is engageable with the second end 36 of the second bar 26 in the locked position. In other examples, such as in examples having one lock 68, the lock 68 may be on either side of the seatback 16 and the lock 68 may be engageable with one of the second end 32 of the first bar 24 and the second end 36 of the second bar 26.

The one or more locks 68 may be of any suitable type that may be releasable to allow the restraint frame 22 to move to the raised position. For example, the one or more locks 68 may be manually operated by an occupant, may be electronically operated, or may be a latch. A manually operated lock 68 may be lockable and releasable by the seated occupant of the seat 14. In such an example, the lock 68 may be a clamp, latch that is operated by the seated occupant, etc. An electronically operated lock 68 may engage when a vehicle computer 70 indicates a seated occupant is seated in the seat 14. In such an example, the lock 68 may be a solenoid that engages the bars 24, 26, an electronically controlled clamp, etc. The electronically operated lock 68 may be activated by a user interface, e.g., a switch, button, touch screen, etc., to indicate the lock 68 and/or the restraint frame 22 to move to the locked position. A latch may be self-locking when the restraint bar reaches the locked position. In such an example, a portion of the bars 24, 26 engages with a portion on the seatback 16 to lock the restraint frame 22 in the locked position and the latch may be disengaged by the seated occupant. Any other suitable type of lock 68 may be used to maintain the restraint frame 22 in the locked position.

The discussed above, the restraint frame 22 includes the lap bar 28. The lap bar 28 extends from the first bar 24 to the second bar 26. Specifically, the lap bar 28 is elongated from the first bar 24 to the second in the cross-seat direction C2. In the locked position, the lap bar 28 is seat-forward of the seatback 16 and seat-forward of the occupant seating area 60. In other words, the occupant seating area 60 is between the lap bar 28 and the seatback 16 in the locked position. The lab bar extend across the lap of a seated occupant seated on the occupant seating area 60 when the restraint frame 22 is in the locked position. In the raised position, because the restraint frame 22 extends upwardly from the seat 14, the lap bar 28 is spaced upwardly of the top end 18 of the seatback 16.

One or more restraint frame motors 72 may be operatively coupled to the restraint frame 22 to move the restraint frame 22 from the locked position to the raised position and from the raised position to the locked position. The one or more restraint frame motors 72 may be supported by the seatback 16 at the top end 18 of the seatback 16. Specifically, the one or more restraint frame motor 72 are operatively coupled to the restraint frame 22 at the hinges 62. In the example shown in the Figures, the hinges 62 may include the restraint frame motor 72. The restraint frame motor 72 may be activated to move the restraint frame 22 from the locked position to the raised position and from the raised position to the locked position. The one or more restraint frame motors 72 may be of any suitable type to move the restraint frame 22 from the locked position to the raised position and from the raised position to the locked position.

With continued reference to FIGS. 2A-6, one or more armrests 74, 76 may be supported by the restraint frame 22. A seated occupant of the seat 14 may use the one or more armrests 74, 76 for comfort when sitting in the seat 14. The arms of the seated occupant may extend between the first bar 24 and the second bar 26 to use the one or more armrests 74, 76. For example, as shown in the examples in the Figures, a first armrest 74 and a second armrest 76 may be supported by the restraint frame 22. In such an example, the first armrest 74 may be supported by one of the first bar 24 and the second bar 26 and the second armrest 76 may be supported by the other of the first bar 24 and the second bar 26. In other examples, the vehicle 12 may include only one armrest. In such an example, the armrest may be supported by one of the first bar 24 or the second bar 26, i.e., the armrest is supported by either the first bar 24 or the second bar 26.

Figure 2A:
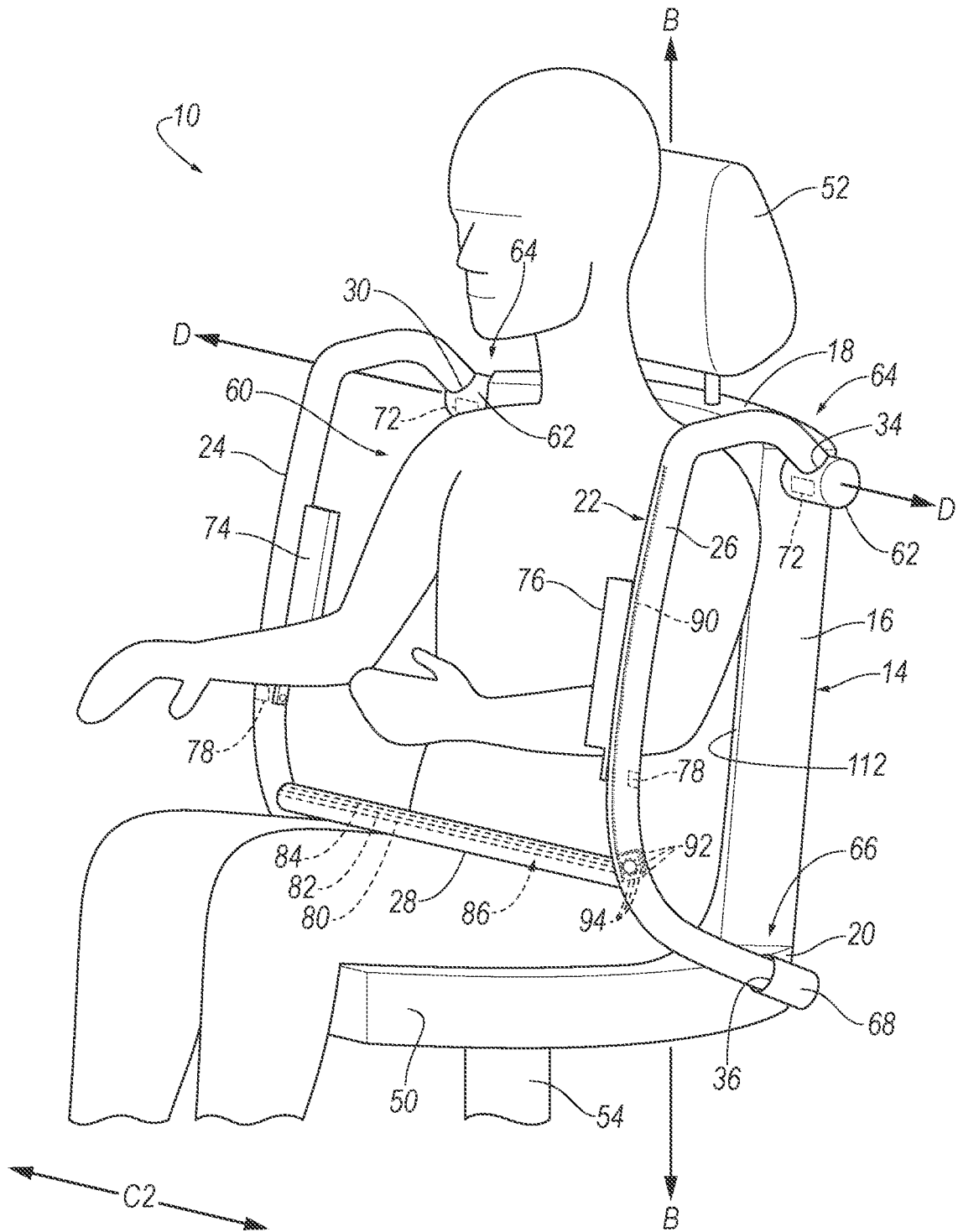
FIG. 2A is a perspective view of a vehicle seat with the first example of the restraint frame in a locked position and armrests in stowed positions.
Figure 2B:
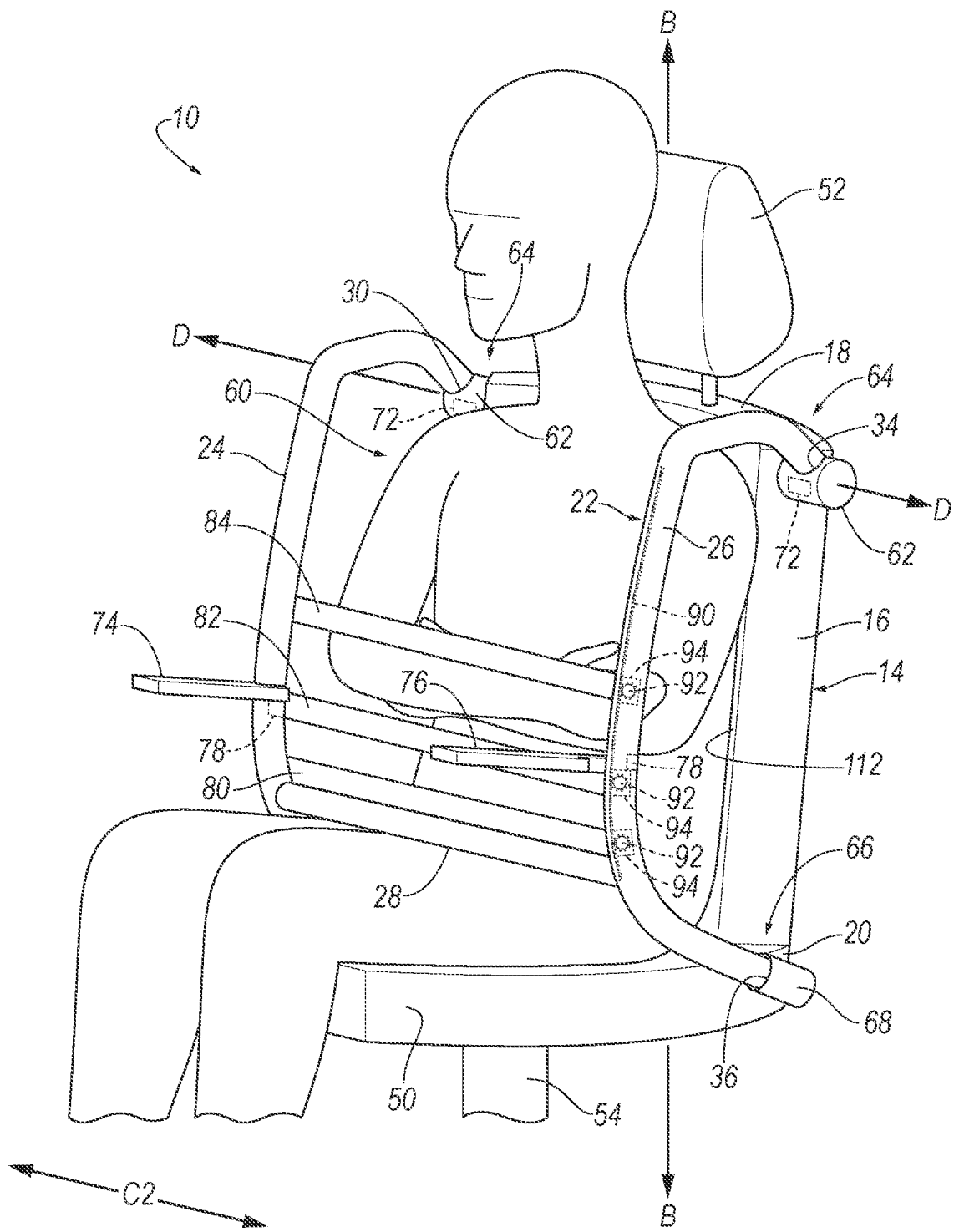
FIG. 2B is a perspective view of the vehicle seat with the first example of the restraint frame having belts moving from a lowered position toward an upper position.

The armrests 74, 76 may be upward from the lap bar 28 of the restraint frame 22. In other words, the armrests 74, 76 are supported by the first bar 24 and the second bar 26 upwardly from the lap bar 28. The armrests 74, 76 may be fixed along the first bar 24 and the second bar 26 but are rotatably relative to the restraint frame 22. The armrests 74, 76 may be rotatable from a stowed position to a user position. Specifically, the armrests 74, 76 are rotatably attached to the first bar 24 and the second bar 26 and may rotate from the stowed position to the user position. In the stowed position, as shown in FIG. 2A, the armrests 74, 76 may be elongated upwardly from along the first bar 24 and the second bar 26. Specifically, in the stowed position, the armrests 74, 76 may be parallel with the first bar 24 and the second bar 26. In the user position, as shown in FIGS. 2B-6, the armrests 74, 76 may be elongated seat-forward away from the seatback 16. The seated occupant of the seat 14 may use the armrests 74, 76 when the armrests 74, 76 are in the user position.

In some examples, the vehicle 12 may include one or more armrest motors 78 operatively coupled to the armrests 74, 76 to move the armrests 74, 76 from the stowed position to the user position. The armrest motors 78 may be fixed to the restraint frame 22 to allow the armrests 74, 76 to be moved from the stowed position to the user location. The one or more armrest frame motors may be of any suitable type to move the armrests 74, 76 from the stowed position to the user position and from the user position to the stowed position. In other examples, the armrests 74, 76 may be manually moved from the stowed position to the user position. In such examples, the seated occupant of the seat 14 may move the armrests 74, 76 to the user position from the stowed position once the restraint frame 22 reaches the locked position.

The restraint frame 22 includes one or more belts 80, 82, 84 elongated from the first bar 24 to the second bar 26. Described further below are restraint frames 22 with three examples of locations of belts 80, 82, 84 elongated from the first bar 24 and the second bar 26. In all the examples described below, the restraint frame 22 includes a first belt 80, a second belt 82, and a third belt 84. In other examples, the restraint frame 22 may include any suitable number of belts 80, 82, 84 at any suitable number of positions along the first bar 24 and the second bar 26. The first belt 80, the second belt 82, and the third belt 84 are elongated along the cross-seat direction C2. For example, the belts 80, 82, 84 may be elongated parallel to the lap bar 28 of the restraint frame 22. The belts 80, 82, 84 may be of any suitable material. For example, the belts 80, 82, 84 may be of woven polyester material. The restraint frame 22 may include any suitable number of belts 80, 82, 84, either more or less than shown in the examples described below.

In two of the examples shown in the Figures, one or more of the belts 80, 82, 84 are movable relative to the first bar 24 and the second bar 26 from lowered positions to upper positions. When the belts 80, 82, 84 are movable, the belts 80, 82, 84 are movable to a position between the first end 30 and the second end 32 of the first bar 24 and the first end 34 and the second end 36 of the second bar 26 that corresponds to a size of the seated occupant of the seat 14.

In the example shown in FIGS. 1A-3A, the restraint frame 22 includes three belts 80, 82, 84 elongated from the first bar 24 to the second bar 26 with all three of the belts 80, 82, 84 being movable relative to the first bar 24 and the second bar 26. The three belts 80, 82, 84 are movable from the lowered position to the upper position. In the lowered position, as shown in FIG. 2A, the belts 80, 82, 84 may be stowed adjacent to or inside of the lap bar 28. For example, the lap bar 28 may include a slot 86 that the belts 80, 82, 84 stowed inside are hidden from view until the restraint frame 22 is in the locked position. After the restraint frame 22 is in the locked position, the three belts 80, 82, 84 move upwardly along the first bar 24 and the second bar 26. The first bar 24 and the second bar 26 may each include slits elongated along the first bar 24 and the second bar 26 that the belts 80, 82, 84 move along. As the belts 80, 82, 84 move, the belts 80, 82, 84 move away from the lap bar 28 toward the upper positions. The first belt 80 is adjacent the lap bar 28 in the upper position. The second belt 82 is spaced upwardly along the first bar 24 and the second bar 26 from the first belt 80 and the lap bar 28. The third belt 84 is spaced upwardly along the first bar 24 and the second bar 26 from the second belt 82. One or more of the belts 80, 82, 84 may move to an upper position that corresponds to a size of the seated occupant of the seat 14. If a seated occupant is shorter, the third belt 84 may move such that a distance between the second belt 82 and the third belt 84 is shorter. If a seated occupant is taller, the third belt 84 may move such that a distance between the second belt 82 and the third belt 84 is larger.

In the example shown in FIG. 4, the restraint frame 22 includes two belts 80, 82 fixed relative to the first bar 24 and the second bar 26. Specifically, the first belt 80 and the second belt 82 are fixed to the first bar 24 and the second bar 26. In other words, the first belt 80 and the second belt 82 a stationary relative to each other and the first bar 24 and the second bar 26. The third belt 84 is movable relative to the first bar 24 and the second bar 26. The third belt 84 may be movable to an upper position that corresponds to a size of the seated occupant of the seat 14. If a seated occupant is shorter, the third belt 84 may move such that a distance between the second belt 82 and the third belt 84 is shorter. If a seated occupant is taller, the third belt 84 may move such that a distance between the second belt 82 and the third belt 84 is larger. The third belt 84 moves to the upper position when the restraint frame 22 is in the locked position. The first belt 80 and the second belt 82 may be fixed to the first bar 24 and the second bar 26 in any suitable way, e.g., brackets, fasteners, etc.

Figure 3:
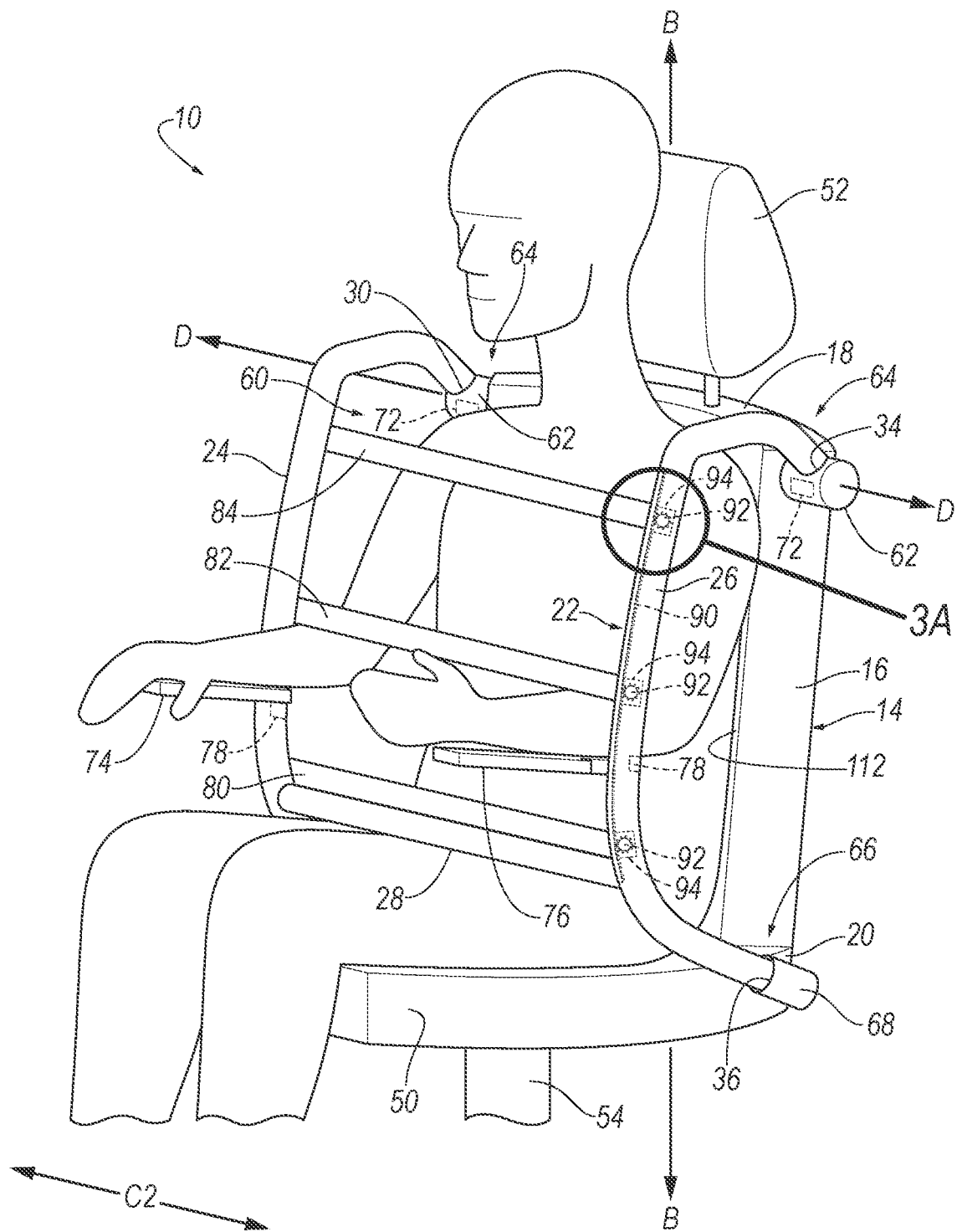
FIG. 3 is a perspective view of the vehicle seat with the first example of the restraint frame having belts in the raised position.
Figure 3A:
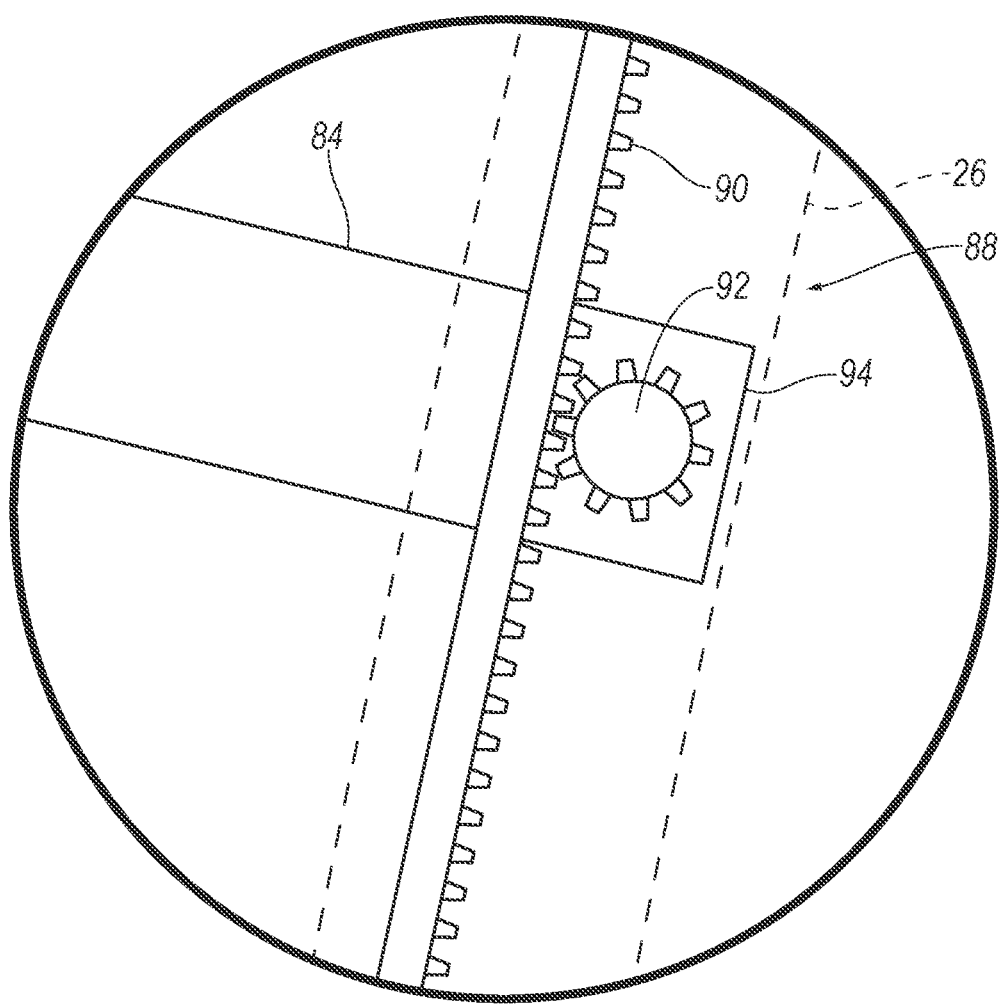
FIG. 3A is a side view of an example of a linear actuator that moves the belts from the lowered position to the upper position.
Figure 4:
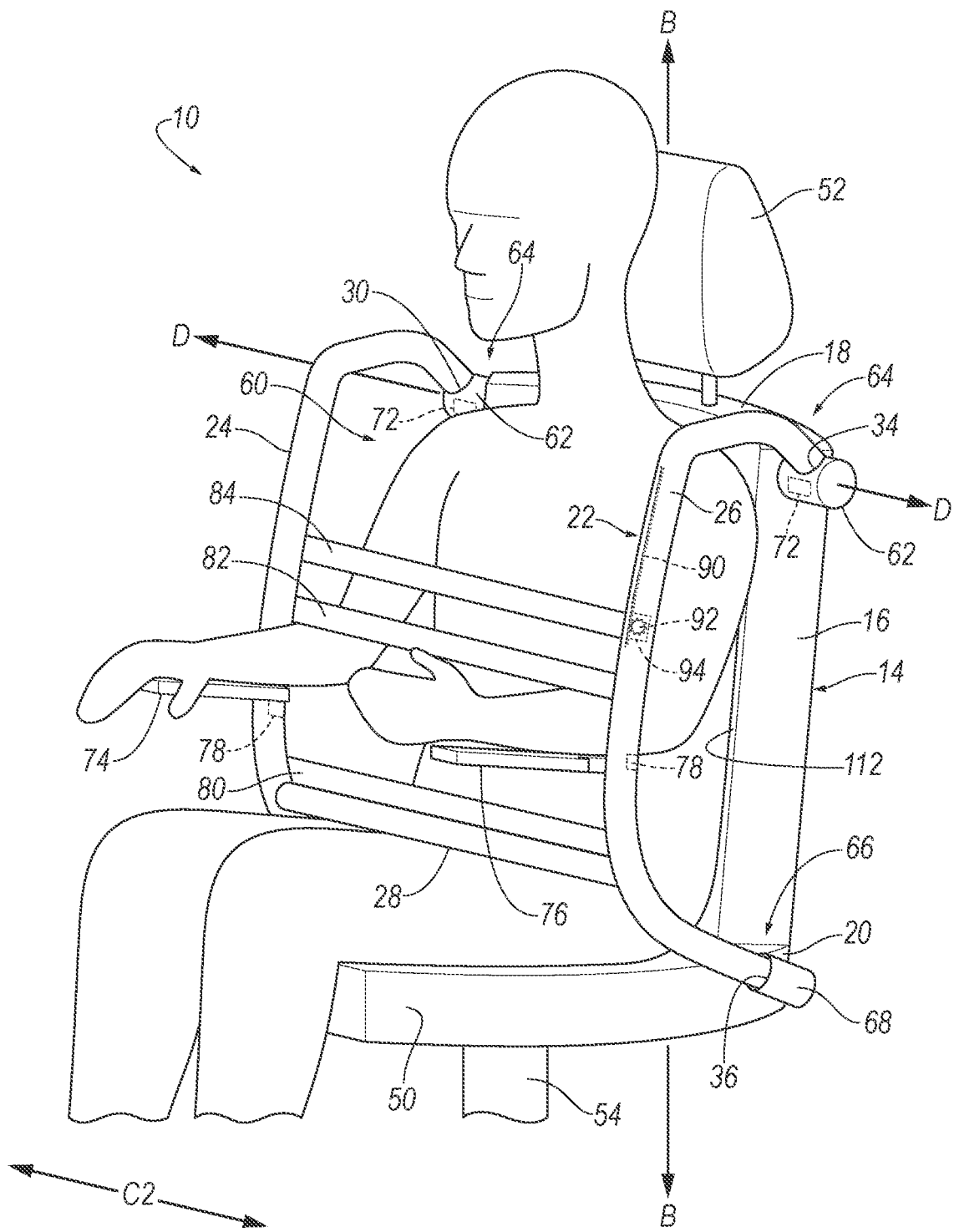
FIG. 4 is a perspective view of the vehicle seat with a second example of the restraint frame having two belts that are fixed relative to the vehicle seat and one belt movable relative to the vehicle seat.
Figure 5:
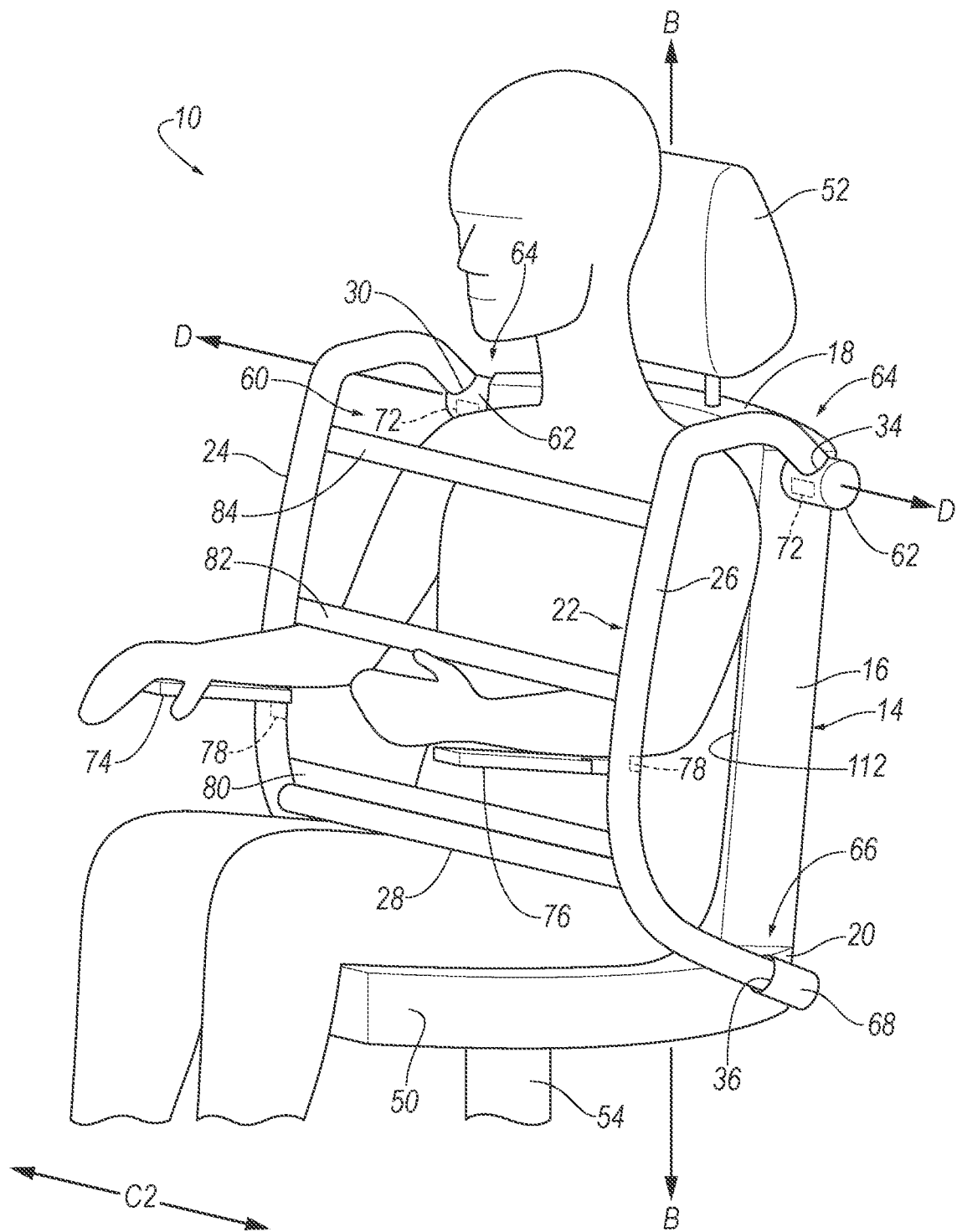
FIG. 5 is a perspective view of the vehicle seat with a third example of the restraint frame having belts that are fixed relative to the vehicle seat.

In both examples shown in FIGS. 1A-3A and FIG. 4, the restraint frame 22 may include a linear actuator 88 to move the belts 80, 82, 84 along the first bar 24 and the second bar 26. With reference to FIG. 3A, one of the first bar 24 or the second bar 26 may be hollow and the linear actuator 88 may be inside one of the first bar 24 or the second bar 26. The linear actuator 88 is operatively coupled to the movable belts 80, 82, 84 in the examples shown in FIGS. 1A-3A and FIG. 4 to move the belts 80, 82, 84 to the upper positions. The linear actuator 88 may include a rack 90 and pinion 92 to move the belts 80, 82, 84 along the first bar 24 and the second bar 26. The linear actuator 88 may include one or more belt motors 94 that rotates the pinion 92 to move along the rack 90, and, in turn, move the belt along the first bar 24 and the second bar 26.

In both examples shown in FIGS. 1A-3A and FIG. 4, once the belts 80, 82, 84 reach the upper positions, seated occupant is between the belts 80, 82, 84 and the seatback 16. In other words, the occupant seating area 60 is between the belts 80, 82, 84 and the seatback 16 when the belts 80, 82, 84 are in the upper positions.

In a third example shown in the FIG. 5, all three of the belts 80, 82, 84 are fixed relative to the first bar 24 and the second bar 26. Specifically, the first belt 80, the second belt 82, and the third belt 84 are fixed to the first bar 24 and the second bar 26. In other words, the locations of the belts 80, 82, 84 when the belts 80, 82, 84 are fixed appear in the upper positions at all times. The belts 80, 82, 84 may be fixed to the first bar 24 and the second bar 26 in any suitable way, e.g., brackets, fasteners, etc. The locations to which the belts 80, 82, 84 are fixed are determined to accommodate any suitable size of a seated occupant.

In some examples, when the belts 80, 82, 84 are in the upper positions, including when the belts 80, 82, 84 are fixed to the first bar 24 and the second bar 26, the restraint frame 22 may include an airbag assembly 96.

Figure 6:
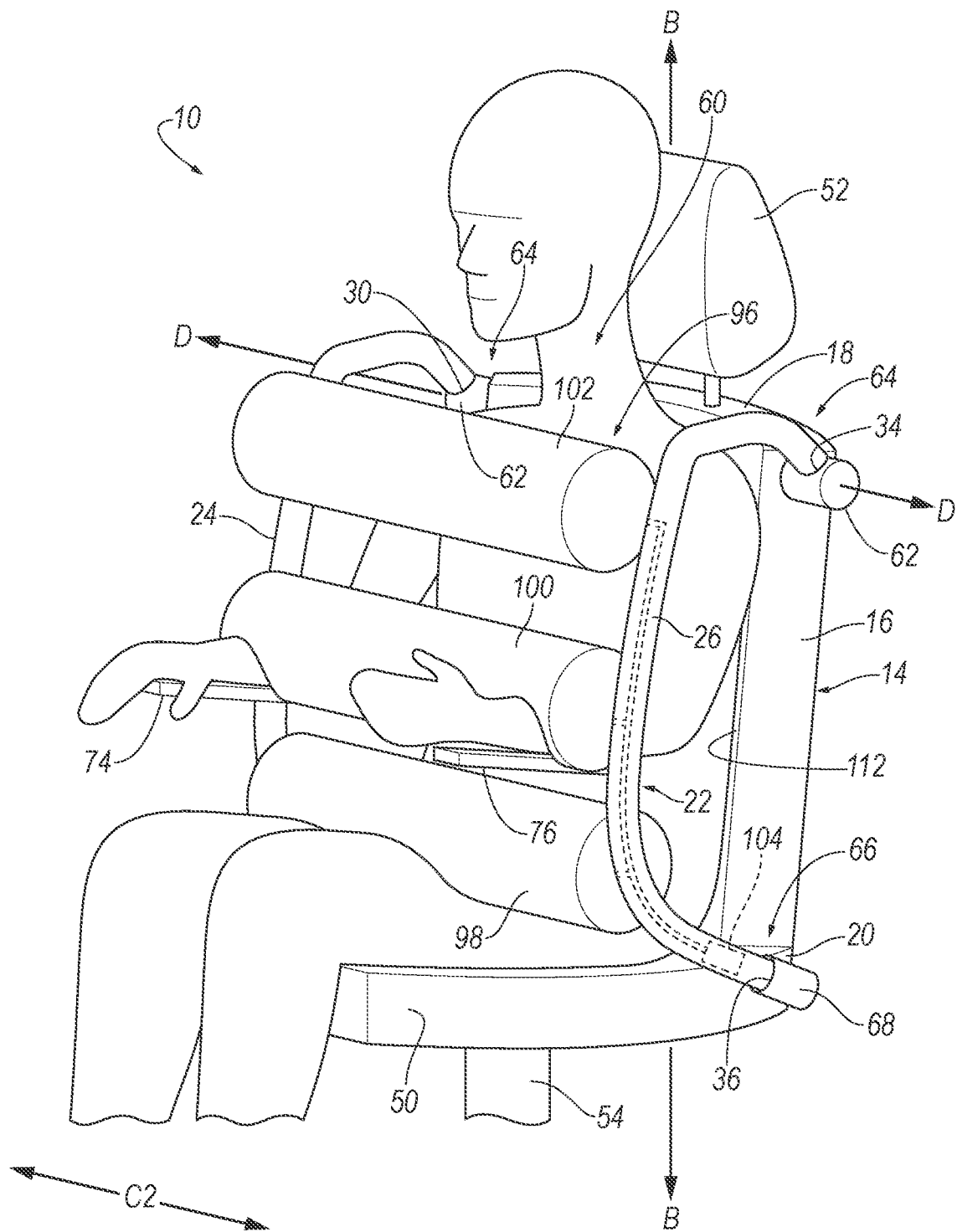
FIG. 6 is a perspective view of the vehicle seat with the restraint frame having three airbags in an inflated position.

As shown in FIG. 6, the airbag assembly 96 includes a number of airbags 98, 100, 102 equal to the number of belts 80, 82, 84 and an inflator 104. In some examples, each of the belts 80, 82, 84 may include an airbag 98, 100, 102. In such an example, the belts 80, 82, 84 may be inflatable and the belts 80, 82, 84 may each include a pair of webbings (not shown) that surround each of the airbags 98, 100, 102. As another example, the belts 80, 82, 84 may support the airbags 98, 100, 102. In such an example, each airbag 98, 100, 102 may be supported by the webbing of the belts 80, 82, 84. In other words, each of the airbags 98, 100, 102 may be fixed to each of the belts 80, 82, 84 and moveable along the bars 24, 26 in examples where the belts 80, 82, 84. The examples shown in FIG. 6, the restraint frame 22 includes three airbags 98, 100, 102 at each of the belts 80, 82, 84, a first airbag 98, a second airbag 100, and a third airbag 102. The first belt 80 includes the first airbag 98, the second belt 82 includes the second airbag 100, and the third belt 84 includes the third airbag 102. The airbags 98, 100, 102 are inflatable from uninflated positions to inflated positions in the event of certain vehicle impacts.

The first airbag 98, the second airbag 100, and the third airbag 102 are between the first bar 24 and the second bar 26 in the inflated position. Specifically, the airbags 98, 100, 102 extend from the first bar 24 to the second bar 26 in the inflated positions. In other words, the airbags 98, 100, 102 are elongated from the first bar 24 to the second bar 26. The airbags 98, 100, 102 are seat-forward of the seated occupant of the seat 14 to control the kinematics of the seated occupant in the event of certain vehicle impacts. The occupant seating area 60 is between the airbags 98, 100, 102 and the seatback 16 of the seat 14. In the inflated position, the airbags 98, 100, 102 are spaced from each other along the first bar 24 and the second bar 26 in the inflated position.

The inflator 104 is fluidly connected to the airbags 98, 100, 102. The inflator 104 expands the airbag with inflation medium, such as a gas, to move the airbag from an uninflated position to the inflated position. The inflator 104 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 104 may be supported by one of the first bar 24 and the second bar 26. Specifically, the inflator 104 may be inside the hollow of one of the first bar 24 and the second bar 26. The inflator 104 may be fluidly connected to the airbag by flexible fill tubes (not shown) extending from the inflator 104 and the airbags 98, 100, 102.

The airbag may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 7:
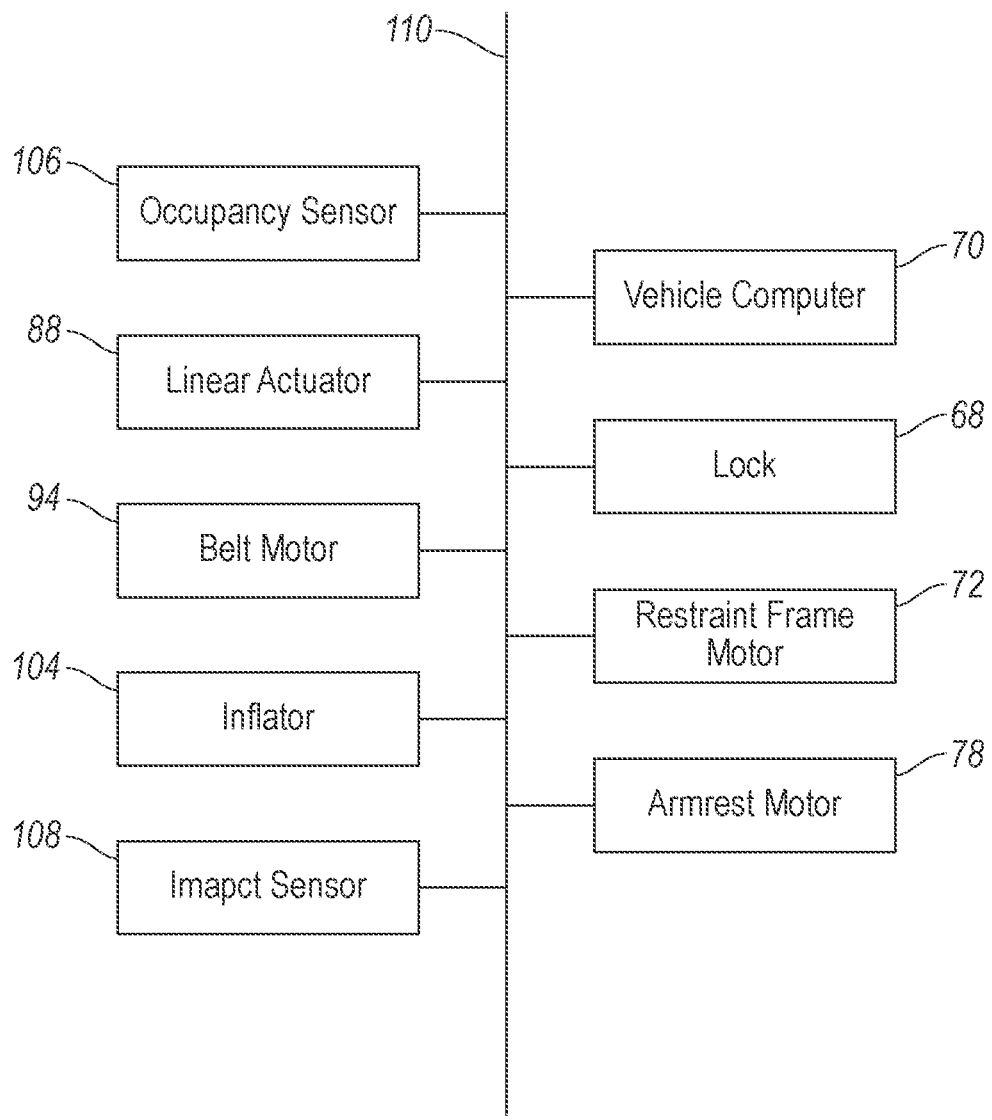
FIG. 7 is a block diagram of a vehicle communication network.

With reference to FIG. 7, the vehicle 12 may include at least one occupancy sensor 106. Specifically, the occupancy sensor 106 may be coupled to the seat 14 to identify whether a seated occupant is seated in the occupant seating area 60. The occupancy sensor 106 may be or be a part of an occupant classification system that classifies the seated occupant that is seated in the seat 14. For example, the occupancy sensors 106 may determine the size of the seated occupant. The occupancy sensor 106 may determine whether the seat 14 is occupied by a child restraint system. The occupant sensors may include cameras, weight sensors, etc. that determine and classify occupants of the seats 14. The size of the occupant may be defined as the height, weight, or other relevant physical characteristics of the occupant that may be included in size measurements. The occupancy sensor 106 may be communication with the vehicle computer 70.

The vehicle 12 may include at least one impact sensor 108 for sensing certain vehicle impacts (e.g., impacts of a certain magnitude, direction, etc.), and the vehicle computer 70 in communication with the impact sensor 108 and the inflator 104. The vehicle computer 70 may activate the inflator 104, e.g., provide an impulse to a pyrotechnic charge of the inflator 104 when the impact sensor 108 senses certain vehicle impacts. Alternatively or additionally to sensing certain vehicle impacts, the impact sensor 108 may be configured to sense certain vehicle impacts prior to impact, i.e., pre-impact sensing. The impact sensor 108 may be in communication with the vehicle computer 70. The impact sensor 108 is configured to detect certain vehicle impacts. The impact sensor 108 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 108 may be located at numerous points in or on the vehicle 12.

With continued reference to FIG. 7, the vehicle computer 70 includes a processor and a memory storing instructions executable by the processor. The memory includes one or more forms of computer readable media, and stores instructions executable by the vehicle computer 70 for performing various operations, including as disclosed herein. The vehicle computer 70 may be a restraints control module. The vehicle computer 70 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 70 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 70.

The vehicle computer 70 is generally arranged for communications on a vehicle communication network 110 that can include a bus in the vehicle 12 such as a controller area network CAN or the like, and/or other wired and/or wireless mechanisms. Alternatively or additionally, in cases where the vehicle computer 70 actually comprises a plurality of devices, the vehicle communication network 110 may be used for communications between devices represented as the vehicle computer 70 in this disclosure. Further, as mentioned below, various controllers and/or sensors may provide data to the vehicle computer 70 via the vehicle communication network 110.

Figure 8:
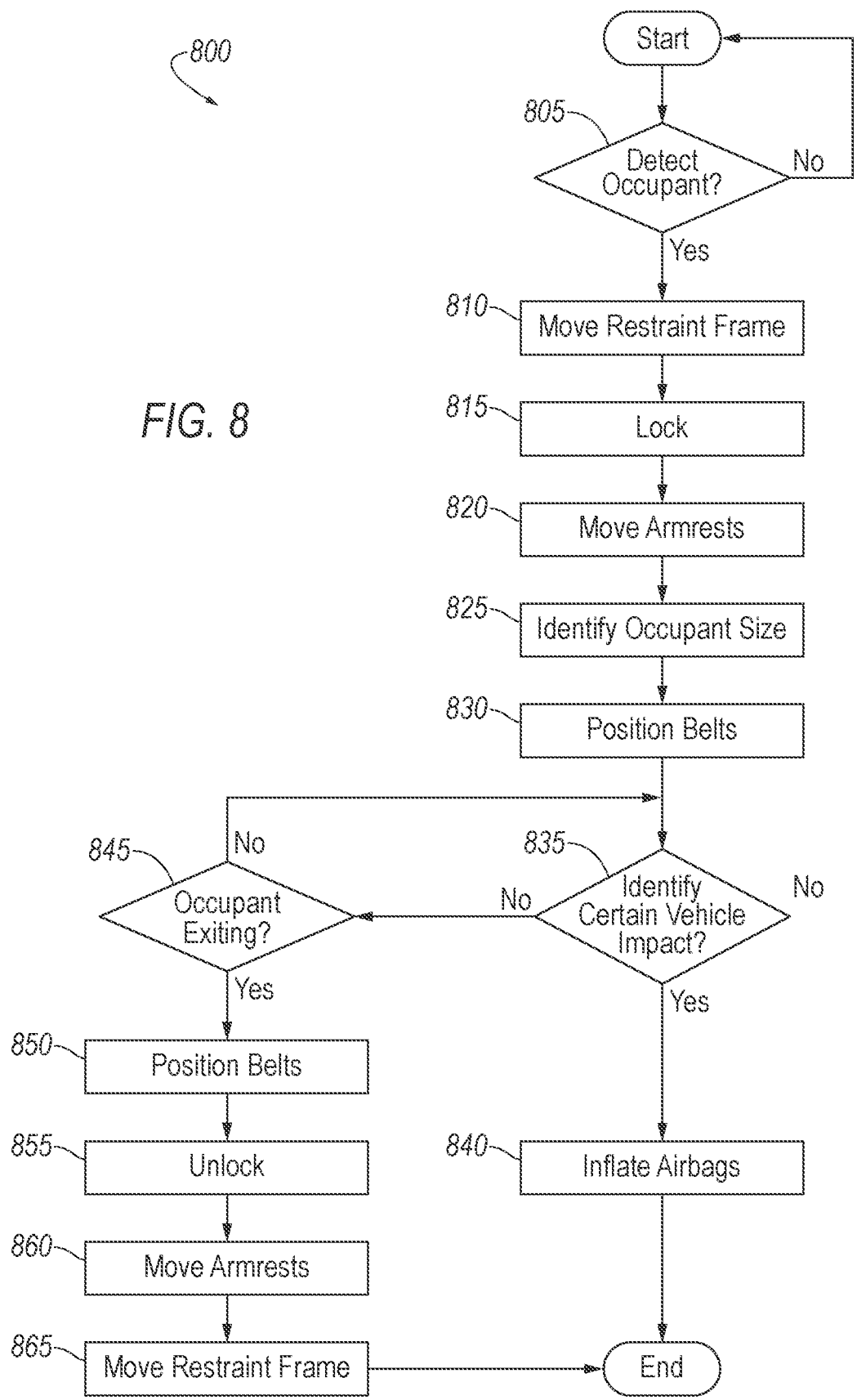
FIG. 8 is a flowchart of a method executable by a vehicle computer.

With reference to FIG. 8, the vehicle computer 70 stores instructions to control components of the vehicle 12 according to a method 800. Specifically, the method 800 includes moving the restraint frame 22 from the raised position to the locked position and, where applicable, moving the belts 80, 82, 84 to the upper positions. The method 800 may include inflating the airbags 98, 100, 102 in the event of certain vehicle impacts. Any use of "based on" and "in response to" herein, including with reference to method 800, indicates a causal relationship, not merely a temporal relationship.

With reference to decision block 805, the method 800 includes detecting occupancy of the seat 14 by a seated occupant. The occupancy sensor 106 may indicate to the vehicle computer 70 that a seated occupant is detected in the seat 14. If a seated occupant is detected, the method 800 moves to block 810. If no seated occupant is detected (e.g., the occupancy sensor 106 detects that no occupant is properly seated on the seat 14, the occupancy sensor 106 detects a child restraint system thus indicating that no occupant is in the seat 14, etc.), the method 800 returns to its start.

With reference to block 810, in response to detecting the seated occupant, move the restraint frame 22 from the raised position toward the locked position. When a seated occupant is detected in the seat 14, the vehicle computer 70 may send a signal to the restraint frame motors 72 to move the restraint frame 22 toward the locked position.

With reference to 815, the method 800 includes locking the first bar 24 and the second bar 26 relative to the seatback 16. In examples where the first bar 24 and the second bar 26 are lockable manually by the seated occupant, the seated occupant may be notified by the vehicle 12 to lock the first bar 24 and the second bar 26 in the locked position by the lock 68. In examples where the first bar 24 and the second bar 26 are lockable electronically, the vehicle computer 70 may send a signal to the electronic lock to lock the restraint frame 22 in the locked position.

With reference to block 820, the method 800 includes moving the armrests 74, 76 from the stowed position to the user position. In examples where the armrests 74, 76 are moved by the armrest motors 78, the vehicle computer 70 may send a signal to the armrest motors 78 to move the armrests 74, 76 to the user position. In other examples, the seated occupant may move the armrests 74, 76 to the user position.

With reference to block 825, based on detecting a seated occupant of the seat 14, the method 800 include identifying a size of the seated occupant. The occupancy sensor 106 may identify the size of the seated occupant and send a signal to the vehicle computer 70 indicating the size of the seated occupant. Block 815, block 820, and block 820 may be executed by the vehicle computer 70 simultaneously or in succession with each other.

With reference to block 830, based on the size of the seated occupant, the method 800 includes positioning the belt or belts 80, 82, 84 between the first end 30 and the second end 32 of the first bar 24 and between the first end 34 and the second end 36 of the second bar 26 to a position that corresponds to the size of the seated occupant. In examples where all three belts 80, 82, 84 are movable, the belts 80, 82, 84 are positioned along the first bar 24 and the second bar 26. In examples where only one belt 80, 82, 84 is movable, the movable belt 84 is positioned along the first bar 24 and the second bar 26. In examples where the belts 80, 82, 84 are movable, the vehicle computer 70 may send a signal to the belt motor 94 or belt motors 94 to move the belts 80, 82, 84 to the upper positions. In examples where none of the belts 80, 82, 84 are moveable, block 830 may be omitted from the method 800.

With reference to decision block 735, the method 800 includes identifying certain vehicle impacts. The impact sensors 108 may send a signal to the vehicle computer 70 indicating certain vehicle impacts. If no vehicle impact is identified, the method 800 moves to decision block 845. If a vehicle impact is identified, the method 800 move to block 840.

With reference to block 840, based on identifying certain vehicle impacts, the method 800 include inflating the airbag from the uninflated position to the inflated position. The vehicle computer 70 may send a signal to the inflator 104 to move the airbag to the inflated position. After the airbag inflates to the inflated position, the method 800 ends.

With reference to block 845, the method 800 includes identifying whether the seated occupant wants to exit the vehicle 12. In some examples, sensors in the vehicle 12, e.g., the occupancy sensors 106, may indicate the occupant intends to exit the vehicle 12. In other examples, the occupant may indicate through a user interface or button that the occupant intends to exit the vehicle 12. If the seated occupant does not want to exit the vehicle 12, the method 800 returns to decision block 735. If the seated occupant does want to exit the vehicle 12, the method 800 moves to block 850.

With reference to block 850, in response to identifying the seated occupant wants to exit, the method 800 includes positioning the belts 80, 82, 84 back the lowered positions. In examples where one or more of the belts 80, 82, 84 is movable, the vehicle computer 70 may send a signal to the belt motors 94 to move the belts 80, 82, 84 to the lowered position. In examples where the belts 80, 82, 84 are not movable, block 850 may be omitted from the method 800.

With reference to block 855, the method 800 includes unlocking the restraint frame 22. In examples where the first bar 24 and the second bar 26 are lockable manually by the seated occupant, the seated occupant may be notified by the vehicle 12 to unlock the lock 68 the first bar 24 and the second bar 26 to move the restraint frame 22 to the raised position. In examples where the first bar 24 and the second bar 26 are lockable electronically, the vehicle computer 70 may send a signal to the electronic lock 68 to unlock to move the restraint frame 22 to the raised position.

With reference to block 860, the method 800 includes moving the armrests 74, 76 to the stowed position. In examples where the armrests 74, 76 are moved by the armrest motors 78, the vehicle computer 70 may send a signal to the armrest motors 78 to move the armrests 74, 76 to the stowed position. In other examples, the seated occupant may move the armrests 74, 76 to the stowed position.

Block 850, block 855, and 860 may be executed by the vehicle computer 70 simultaneously or in succession with each other.

With reference to block 865, the method 800 includes moving the restraint frame 22 from the lowered position to the raised position. When a seated occupant is detected in the seat 14, the vehicle computer 70 may send a signal to the restraint frame motors 72 to move the restraint frame 22 to the raised position. After the restraint frame 22 moves to the raised position, the method 800 ends.

The disclosure has been described in an illustrative manner, and it is to be understood that the terminology which has been used is intended to be in the nature of words of description rather than of limitation. The numerical adverbs "first," "second," and "third" are used herein merely as identifiers and do not signify order or importance. Many modifications and variations of the present disclosure are possible in light of the above teachings, and the disclosure may be practiced otherwise than as specifically described.

What is claimed is:

1. An assembly comprising:
   a vehicle seat including a seatback, the seatback having a top end and a bottom end and being elongated along a first axis from the top end to the bottom end;
   a restraint frame including a first bar, a second bar spaced from the first bar in a cross-seat direction, and a lap bar elongated in the cross-seat direction from the first bar to the second bar;
   the first bar and the second bar each having a first end and a second end, the first bar being elongated between the first end of the first bar and the second end of the first bar, and the second bar being elongated from the first end of the second bar to the second end of the second bar;
   the first end of the first bar and the first end of the second bar being hingedly attached at the top end of the seatback and the second end of the first bar and the second end of the second bar being releasably lockable to the seatback at the bottom end of the seatback;
   the restraint frame being hinged to the seatback and being rotatable about a cross-seat axis from a raised position to a locked position relative to the seatback; and
   the restraint frame including a belt elongated from the first bar to the second bar in the cross-seat direction.

2. The assembly of claim 1, wherein the restraint frame includes a second belt elongated from the first bar to the second bar, the second belt being spaced from the belt along the first bar and the second bar.

3. The assembly of claim 2, wherein the belt and the second belt are movable relative to the first bar and the second bar from a lowered position to an upper position.

4. The assembly of claim 2, wherein the belt includes a first airbag inflatable to an inflated position and the second belt includes a second airbag inflatable to an inflated position, the first airbag and the second airbag each extending from the first bar to the second bar in the inflated positions.

5. The assembly of claim 4, further comprising a third belt extending from the first bar to the second bar and including a third airbag inflatable to an inflated position, the third airbag extending from the first bar to the second bar in the inflated position.

6. The assembly of claim 1, wherein the belt includes an airbag inflatable from an uninflated position to an inflated position, the airbag extending from the first bar to the second bar in the inflated position.

7. The assembly of claim 1, wherein the belt is movable relative to the first bar and the second bar from a lowered position to an upper position.

8. The assembly of claim 7, further comprising a computer including a processor and a memory storing instructions executable by the processor to:
   detect occupancy of the vehicle seat by a seated occupant;
   identify a size of the seated occupant;
   in response to detecting the seated occupant, move the restraint frame from the raised position to the lowered position;
   position the belt between the first end and the second end of the first bar and between the first end and second end of the second bar based on the size of the seated occupant; and
   lock the first bar and the second bar relative to the seatback.

9. The assembly of claim 1, wherein the seatback defines an occupant seating area between the belt and the seatback.

10. The assembly of claim 1, wherein the belt is inflatable to an inflated position between the first bar and the second bar.

11. The assembly of claim 1, further comprising a computer including a processor and a memory storing instructions executable by the processor to:
    detect occupancy of the vehicle seat by a seated occupant;
    in response to detecting the seated occupant, move the restraint frame from the raised position to a lowered position; and
    lock the first bar and the second bar relative to the seatback.

12. The assembly of claim 1, wherein the seatback defines an occupant seating area between the seatback and the restraint frame in the locked position.

13. The assembly of claim 12, wherein the occupant seating area is between the first bar and the second bar in the cross-seat direction.

14. The assembly of claim 1, wherein at least a portion of the first bar and at least a portion of the second bar is spaced seat-forward of the seatback in the locked position.

15. The assembly of claim 1, wherein the restraint frame extends upwardly from the top end of the seatback in the raised position.

16. The assembly of claim 1, further comprising an armrest supported by the restraint frame, the armrest being rotatable relative to the restraint frame.

17. The assembly of claim 16, wherein the armrest is supported by one of the first bar or the second bar.

18. The assembly of claim 16, further comprising a second armrest supported by the restraint frame, the second armrest being rotatable relative to the restraint frame.

19. The assembly of claim 18, wherein the armrest is supported by one of the first bar or the second bar and the second armrest is supported by the other of the first bar or the second bar.

20. An assembly comprising:
    a vehicle seat including a seatback, the seatback having a top end and a bottom end and being elongated along a first axis from the top end to the bottom end;
    a restraint frame including a first bar, a second bar spaced from the first bar in a cross-seat direction, and a lap bar elongated in the cross-seat direction from the first bar to the second bar;
    the first bar and the second bar each having a first end and a second end, the first bar being elongated between the first end of the first bar and the second end of the first bar, and the second bar being elongated from the first end of the second bar to the second end of the second bar;

the first end of the first bar and the first end of the second bar being hingedly attached at the top end of the seatback and the second end of the first bar and the second end of the second bar being releasably lockable to the seatback at the bottom end of the seatback;

the restraint frame being hinged to the seatback and being rotatable about a cross-seat axis from a raised position to a locked position relative to the seatback; and an armrest supported by the restraint frame, the armrest being rotatable relative to the restraint frame.

* * * * *